(12) United States Patent
Craft

(10) Patent No.: US 7,194,626 B2
(45) Date of Patent: Mar. 20, 2007

(54) HARDWARE-BASED SECURE CODE AUTHENTICATION

(75) Inventor: David John Craft, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 875 days.

(21) Appl. No.: 10/302,447

(22) Filed: Nov. 21, 2002

(65) Prior Publication Data

US 2004/0103291 A1    May 27, 2004

(51) Int. Cl.
H04L 9/00 (2006.01)
(52) U.S. Cl. .......................... 713/168; 713/176; 713/2
(58) Field of Classification Search .................. 713/2, 713/168, 176
See application file for complete search history.

(56) References Cited

U.S. PATENT DOCUMENTS

| | | | |
|---|---|---|---|
| 4,713,753 A | 12/1987 | Boebert et al. | |
| 5,018,096 A | 5/1991 | Aoyama | |
| 5,355,413 A | 10/1994 | Ohno | |
| 5,648,648 A | 7/1997 | Chou et al. | |
| 5,692,199 A | 11/1997 | Kikinis et al. | |
| 5,724,423 A | 3/1998 | Khello | |
| 5,805,880 A | 9/1998 | Pearce et al. | |
| 5,963,142 A | 10/1999 | Zinsky et al. | |
| 5,987,133 A | 11/1999 | Aisaka | |
| 6,009,520 A | 12/1999 | Gharda | |
| 6,138,236 A * | 10/2000 | Mirov et al. | 726/26 |
| 6,141,752 A | 10/2000 | Dancs et al. | |
| 6,145,085 A | 11/2000 | Tran et al. | |
| 6,160,903 A | 12/2000 | Hamid et al. | |
| 6,185,678 B1 | 2/2001 | Arbaugh et al. | |
| 6,226,742 B1 | 5/2001 | Jakubowski et al. | |
| 6,263,431 B1 | 7/2001 | Lovelace et al. | |
| 6,327,652 B1 | 12/2001 | England et al. | |

(Continued)

FOREIGN PATENT DOCUMENTS

WO    WO 01/57657 A1    8/2001

OTHER PUBLICATIONS

Guendouz, H. and Bouaziz, S.; "Rapid Prototype of a Fast Data Encryption Standard With Integrity Processing for Cryptographic Applications"; *IEEE* (ISBN 0-7803-4455-3); May-Jun. 1998; vol. 6, pp. 434-437.

(Continued)

*Primary Examiner*—Gilberto Barron, Jr.
*Assistant Examiner*—Samson Lemma
(74) *Attorney, Agent, or Firm*—Stephen R. Tkacs; Stephen J. Walder, Jr.; D'Ann N. Rifai

(57) ABSTRACT

The present invention provides for authentication of code, such as boot code. A memory addressing engine is employable to select a portion of a memory, as a function of a step value, as a first input hash value. The step value allows for the non-commutative cumulative hashing of a plurality of memory portions with a second input hash value, such as a previous hash value that has been rotated left. An authenticator circuit is employable to perform a hash upon the portion of memory and the second input hash value. A comparison circuit is then employable to compare an output of the authenticator circuit to an expected value.

17 Claims, 4 Drawing Sheets

U.S. PATENT DOCUMENTS

| | | | |
|---|---|---|---|
| 6,823,463 | B1 | 11/2004 | Challener et al. |
| 6,892,305 | B1 | 5/2005 | Dayan et al. |
| 6,918,036 | B1 * | 7/2005 | Drews ........................ 713/176 |
| 2001/0013098 | A1 | 8/2001 | Angelo et al. |
| 2003/0074548 | A1 | 4/2003 | Cromer et al. |
| 2003/0079132 | A1 | 4/2003 | Bryant |
| 2003/0200454 | A1 * | 10/2003 | Foster et al. ................ 713/200 |
| 2003/0229777 | A1 * | 12/2003 | Morais et al. .................. 713/2 |
| 2004/0230818 | A1 | 11/2004 | Craft |
| 2005/0138270 | A1 * | 6/2005 | Morais et al. .............. 711/102 |

OTHER PUBLICATIONS

Schneier, B.; "Protocols, Algorithms, and Source Code in C"; *Applied Cryptography, Second Edition*; 1996; pp. 3-31, 38-40, 76, 107, 165-166, 351-355, 428-459; John Wiley & Sons, Inc.

Hepper, Stefan and Schaeck, Thomas; "System and Method for Downloading Application Components to a Chipcard"; U.S. Appl. No. 09/679,333, filed Oct. 4, 2000.

"Secure Remote Configuration for Networked Computer Systems"; IBM Technical Disclosure Bulletin; Jan. 1998; vol. 41, No. 01; pp. 653-655.

* cited by examiner

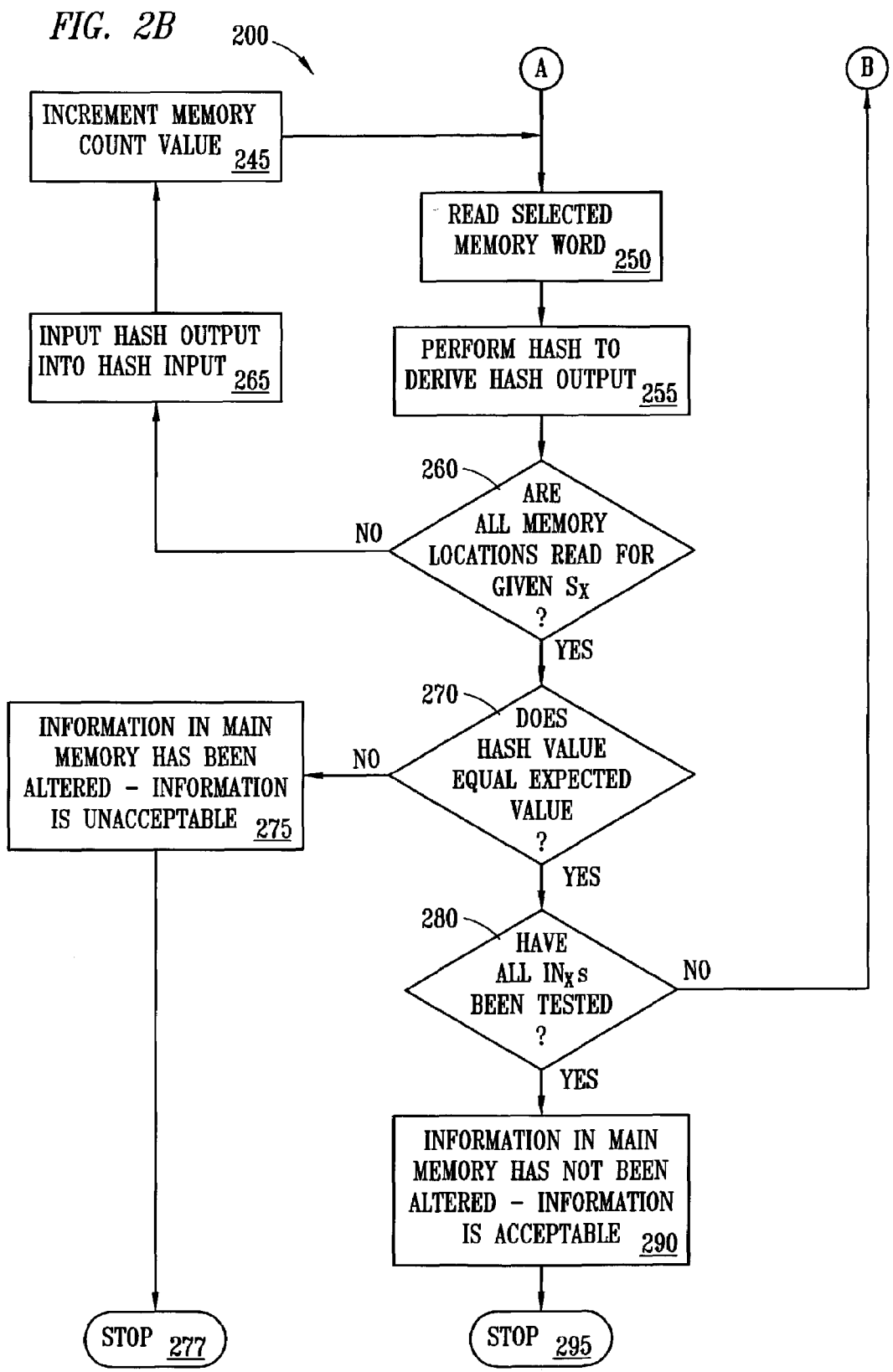

HARDWARE-BASED SECURE CODE AUTHENTICATION

TECHNICAL FIELD

The invention relates generally to a boot control mechanism and, more particularly, to a boot control mechanism employing hardware signatures.

BACKGROUND

Security in a computer system is a concern. Unauthorized reading of code or data can occur in a computer system, or code or data can be inadvertently or maliciously changed within the computer system.

A conventional solution to security on boot code procedures is the employment of a software cryptographic lock, also known as a software cryptographic signature. Generally, the software cryptographic lock or cryptographic signature analyzes a piece of boot code by performing a function, such as a hash function, upon the suspect boot code. If the value calculated by the hash function is correct (that is, the software "signature" is correct), the suspect code is deemed to be secure and is allowed access to the system.

However, there are a variety of disadvantages associated with software hash systems. For instance, the computational complexity for hashing a block of 512 bits can be significant. Using a 32-bit RISC computer, for example, several thousand instructions can typically be used to process a 512 bit block of input data. Consequently, hash systems also generally provide slower validation processes. Therefore, a need exists for a hashing process that overcomes at least some of the deficiencies of conventional systems.

SUMMARY

The present invention authenticates code, such as a boot code. A memory addressing engine selects a portion of a memory as a function of a step value for employment as a first input hash value. A second input hash value is also provided. An authenticator circuit is employable to perform a hash upon the selected portion of memory and the second input hash value. A comparison circuit is also employable to compare an output of the authenticator circuit to an expected value.

BRIEF DESCRIPTION OF THE DRAWINGS

For a more complete understanding of the present invention, and the advantages thereof, reference is now made to the following Detailed Description, taken in conjunction with the accompanying drawings, in which:

FIGS. 2A and 2B illustrate a method diagram for employing the hash system; and

DETAILED DESCRIPTION

In the following discussion, numerous specific details are set forth to provide a thorough understanding of the present invention. However, those skilled in the art will appreciate that the present invention may be practiced without such specific details. In other instances, well known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or a microprocessor executing firmware, or some combination thereof. In one embodiment, dedicated integrated logic circuits that are encoded to perform such functions are used. In other embodiments, functions are performed by a processor, such as a computer or an electronic data processor, in accordance with code, such as computer program code, software, and/or integrated circuits that are coded to perform such functions, unless indicated otherwise.

Figure 1:
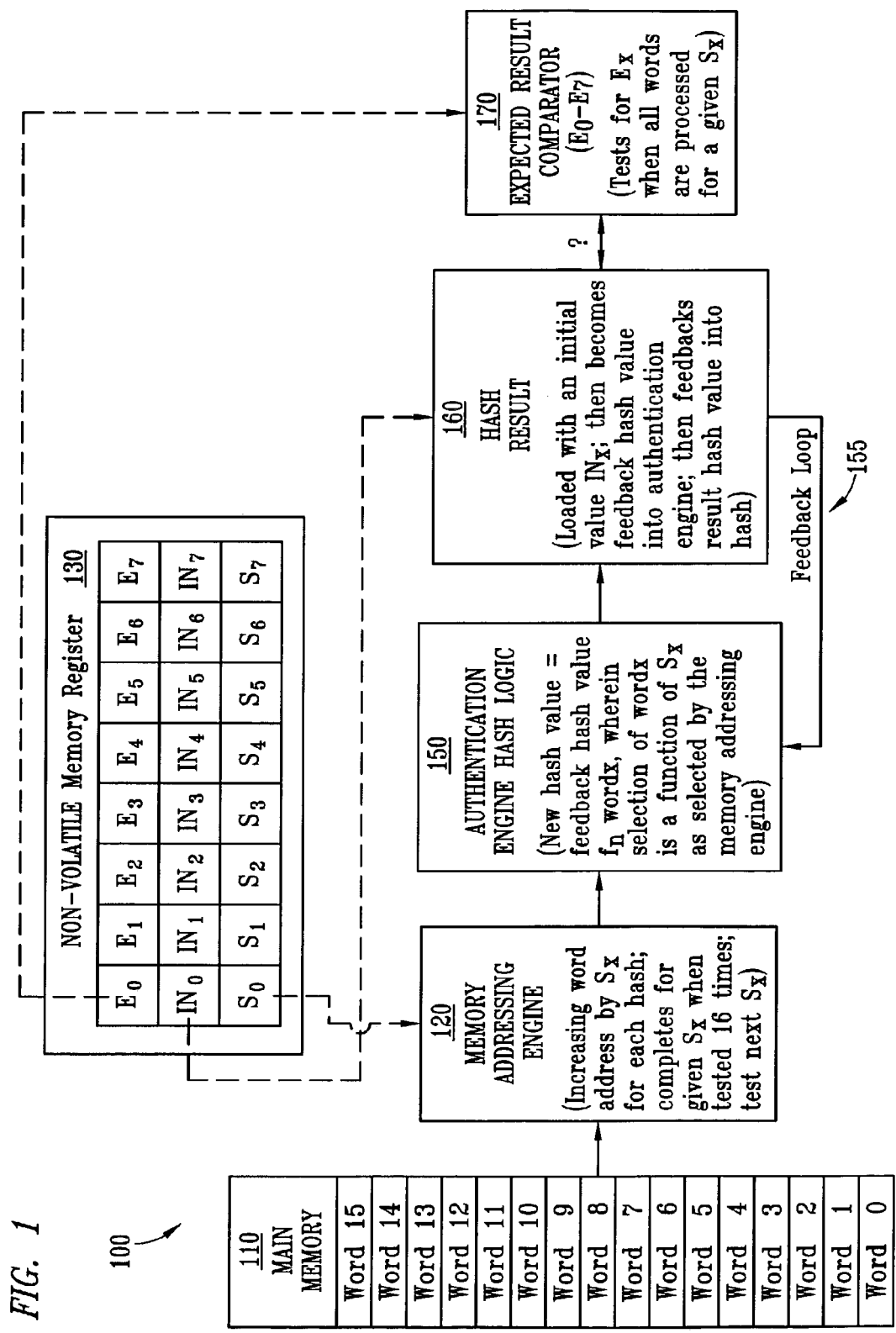
FIG. 1 schematically illustrates a hash system for validating boot code.

Turning now to FIG. 1, disclosed is a hash system 100. The hash system 100 comprises a main memory 110. The main memory 110 is divided into 16 memory words, memory word 0 to memory word 15. In the illustrated embodiment, the main memory is 512 bits, and each memory word is 32 bits, although those of skill in the art will understand that other main memory 110 sizes are within the scope of the present invention.

The hash system 100 comprises a non-volatile memory register 120. The memory register 120 comprises initialization values $IN_X$ ($IN_0$ through $IN_7$), a prime factor control, or "skip" value, $S_x$ ($S_0$ through $S_7$), and expected values $E_x$ ($E_0$ through $E_7$). These values are stored within the non-volatile memory 130 even when no power is applied to the system 100, thereby circumventing attempts of an authorized individual from changing these values and altering the hash function output.

Generally, the $IN_x$ value is a seed value that is input into an authentication engine 150. The $IN_x$ value is combined with word 0 in a hash function within the authentication engine 150. The hash logic 150 then performs a hash upon the two inputs. As is understood by those of skill in the art, a hash can be generally defined as non-commutative, cumulative combinatorial mathematical functions performed upon input, thereby creating a hardware boot code signature ("signature"). A good cumulative combinatorial function would be one in which all bits of the result from the previous iteration of the function are combined with all the bits of the input to produce a new result. Furthermore, all bits of the result should depend in some manner on the input and previous result values. A non-commutative function is one which performs operations in such a manner that the result of two successive iterations also depends on the order in which it processes the two input values. For example, the ADD function is commutative because (A+B) is the same as (B+A), but the SUBTRACT function is non-commutative, because (A−B) is not the same as (B−A) (unless A and B have identical values).

In the illustrated embodiment of FIG. 1, a hash of the memory words is performed by the authenticator 150. A hash result 160 comprises a function of the initial seed value and word 0. This creates a hash output, which is output into hash result 160. This output is then fed back to the input of the hash function through feedback loop 155. Substantially simultaneously, a second memory word is also fed into the input of the hash of the authentication engine 150, thereby creating a new hash result.

An $S_x$ value is then input from the non-volatile memory register 130 into the memory addressing engine 120. Generally, the memory addressing engine 120 selects words from the main memory 110 as a function of the $S_x$ value. The selected word is then input into a hash function 150, one per hash. Each selection of a new word by the memory addressing engine 120 occurs when a new hash is performed by the authentication engine 150. For instance, if $S_x=1$, the memory words would be selected by the memory addressing engine 120 in the order of memory word 0, memory word 1, memory word 2, and so on, one per hash performed by the authentication engine 150. If $S_x=3$, the memory word 0 would be loaded as memory word 0, memory word 3, memory word 6, and so on, one per hash performed by the authentication engine 150. In one embodiment, the first word loaded is defined to be word 0.

In one embodiment, the skip value is a prime number relative to the number of memory ranges to be tested. For instance, in FIG. 1, there are 16 memory words to be tested. Sixteen equals $2^4$. Therefore, any number between one and sixteen that is not a factor of 2 is an acceptable prime number and can be used for $S_x$. The order of selection of the memory words is performed by the memory addressing engine 120 by starting from a specified memory range, such as the range "0." Then, the $S_x$ value is added to determine the next acceptable address range.

| Prime | Order of Combination of Memory Words 0–15 |
|---|---|
| $S_x = 1$ | 0, 1, 2, 3, 4, 5, 6, 7, 8, 9, 10, 11, 12, 13, 14, 15 |
| $S_x = 3$ | 0, 3, 6, 9, 12, 15, 2, 5, 8, 11, 14, 1, 4, 7, 10, 13 |
| $S_x = 5$ | 0, 5, 10, 15, 4, 9, 14, 3, 8, 13, 2, 7, 12, 1, 6, 11 |
| $S_x = 7$ | 0, 7, 14, 5, 12, 3, 10, 1, 8, 15, 6, 13, 4, 11, 2, 9 |
| $S_x = 11$ | 0, 11, 6, 1, 12, 7, 2, 13, 8, 3, 14, 9, 4, 15, 10, 5 |
| $S_x = 13$ | 0, 13, 10, 7, 4, 1, 14, 11, 8, 5, 2, 15, 12, 9, 6, 3 |
| $S_x = 15$ | 0, 15, 14, 13, 12, 11, 10, 9, 8, 7, 6, 5, 4, 3, 2, 1 |

In other words, the hash circuit 150 employs the word selected by the memory addressing engine 120 as a function of the skip value $S_x$ in a cumulative, non-commutative hashing. The result of each non-commutative combination hashing is then fed back into the hash circuit, to be combined with the next word selected by the memory addressing engine 120 in a non-commutative cumulative fashion.

For instance, if $S_x=3$, first memory word 0 would be fed into the hash function from the memory addressing engine 120, along with the seed value $IN_x$. Then, the output of the hash performed by the authentication engine 150 is fed back into the hash of the authentication engine 150 through feedback loop 155. The memory addressing engine then outputs to the authentication engine another word, 3. These are both hashed together again in the authentication engine 150. The output of this new hash is fed as further input into the hash of the authentication engine 150 through feedback loop 155, along with the word 6 selected by the memory addressing engine, and so on. This process of hashing continues until all memory ranges have been tested.

In the illustrated embodiment, the hash circuit 150 employs the skip value $S_x$ until all locations in the main memory 110 are read and non-commutatively combined. In the illustrated embodiment, $S_x$ is prime, or is composed of prime factors which do not include those forming the size of the main memory 110. Therefore, each memory word of memory 110 is selected once for a given $S_x$ if the value of $S_x$ is employed by the memory addressing engine 120 a number of times equal to the number of words in the main memory 110. For example, if $S_x$ equals 3, and there are 16 words in memory, when the memory addressing engine 120 has selected and transmitted words 0, 3, 6, 9 and so on, 16 times, all words in the memory 110 have been selected by the memory addressing engine 120 and transmitted to the authentication engine 150 for hash processing.

In the illustrated embodiment, once the word selected by the memory addressing engine 150 is higher than the word count that is contained within main memory, the count "wraps around" back to zero. For instance, if the $S_x$ value is "3," and the last word selected by the memory addressing engine 120 is word 15, the next word to be selected is word 2, word 5, and so on. In one embodiment, the selection of words by the memory addressing engine continues until the number of selections equals the number of words in the main memory 110.

Once all memory ranges have been tested in combination with a given $IN_x$, a final hashed value ($FV_x$) for the given $IN_x$ is then input into the hash result register 160. The hash result register 160 compares the $FV_x$ to the expected value $E_x$ received from the non-volatile memory register 130. If the two are equal, then the words in the main memory 110 have successfully passed the test associated with that particular $IN_x$ value. The system 100 then starts testing the next $IN_x$ value, and the memory addressing engine 100 employs the next associated $S_x$ value for the next round of memory word selection. If there are no more $IN_x$ values to hash, then the memory information, such as boot code has passed the hashing logic and is, therefore, "secure", that is, unaltered, and the test ends. However, if for any value $IN_x$ the $FV_x$ is not equal to the $E_x$, the words in main memory 110 have not successfully passed the test associated with the $IN_x$ value, the code is deemed "altered," the code is unacceptable, and the test ends.

In the illustrated embodiment, increasing the number of $S_x$ values employed for generating $FV_x$s compared to the $E_x$s typically decreases the odds of altered code being mistakenly deemed unaltered when the hash result is compared to the $E_x$. For instance, although altered code could pass a first pass of the memory for a given $S_x$, thereby creating a $FV_1$ that was correct, employing a new value of $S_x$ by the memory addressing engine 120 and performing a second pass through the memory 110 in a different order for employment by the authentication engine 150 typically generates a different $FV_x$. The probability of adulterated code passing all comparisons between $FX_x$s and $IN_x$s decreases with each additional $FV_x$ that is calculated.

In the illustrated embodiment of FIG. 1, the authentication engine 150 employs a cumulative, but non-commutative, process to combine the series of words and hash results to construct hash, or signature, values for comparison with the expected value $E_x$, one per $IN_x$. As will be understood by those of skill in the art, non-commutative implies the hash result, generated by the hash circuit 150, and depends upon the order in which input values are processed by the hash circuit 150, as well as the input values themselves.

For example, generally, if a function $f_c$ used to combine various values is commutative, then (A $f_c$ B) yields the same result as (B $f_c$ A). However, in the illustrated embodiment, the selected word by the memory addressing engine 110 and the hash result 160 are to be combined in the non-commutative cumulative hash circuit 150, as the function employed by the circuit 150 is non-commutative. Therefore, (A $f_n$ B) and (B $f_n$ A) generally yield different results.

In one embodiment, the authentication engine 150 employs a rotate left 1 bit ("rotl") functionality. Generally, rotl takes data, such as a memory range or a seed value, stores then erases the most significant digit, moves each digit to the next highest significant placeholder, and places the stored most significant digit into the least significant digit placeholder. In one embodiment, a rotate right function is employed. Also, other functions can be employed to make the logic combinations non-commutative.

In the illustrated embodiment, the authentication engine 150 employs combinations of at least two values, at least one of which has been altered to make the combination a generally non-commutative cumulative function.

$$\text{New hash value} = (\text{Old hash feedback output } f_n \text{ word}_x). \quad\quad 1.$$

In other words, the old hash feedback output is combined in a non-commutative combinatorial manner with a word $S_x$ selected by the memory addressing engine 120. For the memory word 0, the hash seed value $IN_x$ is substituted for the old hash output.

In FIG. 1, a non-commutative cumulative function $f_n$ comprises employment of a "rotl" functionality. In one embodiment, the values are combined using a logical AND function.

$$\text{New hash value} = (\_rotl,(R,1) + \text{word}_x) \quad\quad 2.$$

In other words, rotate left the old hash value by 1, which was the feedback hash value from the hash result 150, and then add the word, selected by the memory addressing engine 120, to get the hash result. In another embodiment, the values are combined using a logical XOR function. Generally, employment of the non-commutative cumulative function, such as rot1 functionality, within the authentication engine 150, decreases the odds of adulterated code deemed unadulterated when the system 100 compares the $FV_x$ to $E_x$.

Figure 2A:
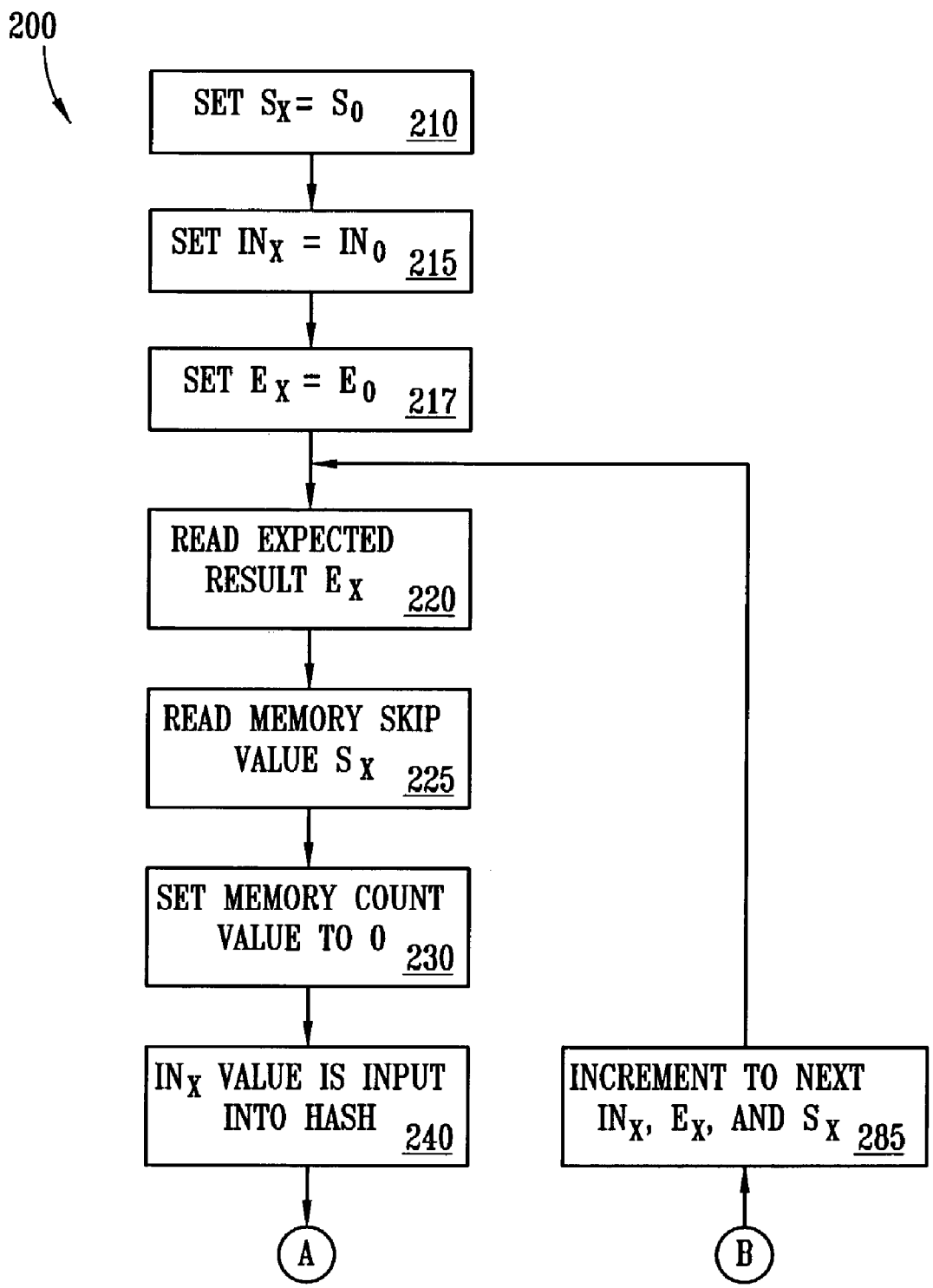

Turning now to FIGS. 2A and 2B, illustrated is a method 200 for authenticating code. Generally, in the method 200, the authentication engine 150 hashes input values to create a series of $FV_x$. These $FV_x$s are compared to the expected value $E_x$ to determine whether the words of the main memory 110 contain unaltered code and/or data, or whether the code and/or data has been altered, and therefore unacceptable.

In step 210, the memory addressing engine 120 defines $S_x$ as $S_0$. In step 215, $IN_x$ is defined as $IN_0$. In step 217, $E_x$ is defined to be $E_0$.

In step 220, the expected value $E_x$ is read from the non-volatile memory register 130 by the expected result comparator 170. In step 225, the step value $S_x$ is read from the non-volatile memory register 130 by the memory addressing engine 120. Typically, the value $S_x$ is a prime number or a combination of prime numbers in relation to the memory to be authenticated, such as main memory 110. In method 200, for ease of illustration, $S_0=1$, although other values for $S_0$ are within the scope of the present invention.

In step 230, a memory count value is set equal to zero. The memory count value can be generally defined as how many times the value $S_x$ has been added to the starting value. In one embodiment, the starting value is zero, corresponding to word zero.

In step 240, the $IN_x$ value is input from the non-volatile memory register 130 into the hash result 160, which is fed into the authentication engine 150 through feedback loop 155. In a further embodiment, $IN_x$ is input directly into the authentication engine 150.

In step 250, a selected word from main memory 110, correlating to $S_x$ multiplied by the memory count value, is transmitted from the memory addressing engine 120 to the authentication engine 150. If the memory count value is a higher number than the number of words in memory, a memory wrap around occurs.

In step 255, the selected word from main memory 110 is hashed with either the seed value $IN_x$ or the previous hash result. This hashing can comprise such hashing as is disclosed in equation (1).

In step 260, the memory addressing engine 120 determines if all memory locations or portions, such as words, for a given $S_x$ have been read. In one embodiment, this is performed through comparing the memory count value to the number of words in main memory 110. If all words in main memory 110 have not been selected, then step 245 is executed. In step 245, the output of the hash circuit 150 is fed back into the input of the hash circuit through employment of the feedback loop 155, as illustrated in equation (1). Then, in step 265, the cumulative non-commutative hash is again performed, and the memory location count value is incremented by "1." Step 250 re-executes again, and this loop continues until all words have been read for a given $S_x$.

However, if all memory locations have been read for a given $S_x$, then step 270 determines whether the final value $FV_x$ of the hash circuit 150 is equal to the expected value $E_x$ that is stored in the non-volatile memory register 130. In step 275, if they are not equal, the code and data in main memory 110 has been altered and is, therefore, unreliable and has failed validation. The method then stops at step 277.

However, if the final hash value for the given $S_x$ does equal the expected value $E_x$ then the words in main memory 110 have passed authentication for that combination of the values of $S_x$ and $IN_x$. Then in step 280, the method 200 determines whether all $IN_x$ values have been tested. If they have, then the words in the main memory 110 have passed the validation, and have not been altered. Therefore, the method ends at step 295.

However, if all $IN_x$s have not been tested, in step 285, the selected $IN_x$ is then incremented from $IN_x$ to $IN_{(x+1)}$, such as $IN_3$ to $IN_4$. Furthermore, the corresponding $S_x$ is also incremented to $S_{(x+1)}$, such as from $S_3$ to $S_4$. $E_x$ would be incremented to $E_{(x+1)}$, such as from $E_3$ to $E_4$. Then, the method 200 executes again until either all $IN_x$s have been tested and pass the test, or until a final hash value $FHV_x$ does not equal its corresponding $E_x$.

Figure 3:
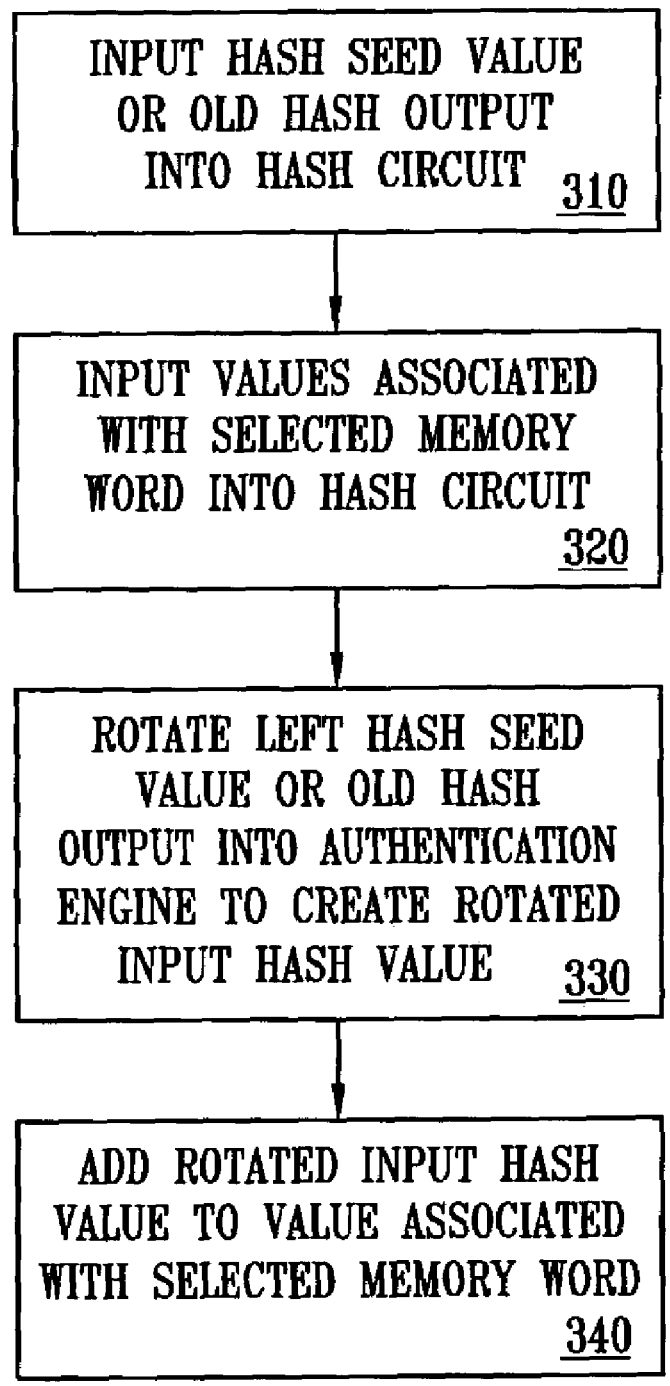
FIG. 3 illustrates a method diagram for employing the hash logic hardware.

Turning to FIG. 3, disclosed is a method diagram 300 for generating a hash value, such as is performed in step 255 of method 200. In step 310, the hash circuit inputs the $IN_x$, or the previous hash output from a previous invocation of the step 255. In step 320, the word selected by the memory addressing engine 120 is also input into the hash. In step 330, either the word or the previous value is rotated left to create a rotated input hash value. Finally, in step 340, the rotated input hash value is added to the non-rotated hash value to get hash result. In one embodiment, the previous hash value is the value that is rotated left.

It is understood that the present invention can take many forms and embodiments. Accordingly, several variations may be made in the foregoing without departing from the spirit or the scope of the invention. Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of embodiments. Accordingly, it is appropriate that the appended claims be construed broadly and in a manner consistent with the scope of the invention.

The invention claimed is:

1. A system for authentication of code, comprising:
   a memory addressing engine, employable to select a sub-portion of a portion of code in memory, as a function of a step value, as a first input hash value;
   a second input hash value;
   an authenticator engine employable to perform a hash upon both the portion of code and the second input hash value;
   a comparison circuit, employable to compare an output of the authenticator engine to an expected value,
   wherein in a first iteration, the memory addressing engine selects a first sub-portion of the portion of code, the second input hash value is an initial seed value, and the authenticator engine performs a hash upon the first sub-portion and the initial seed value;
   wherein in a subsequent iteration, the memory addressing engine selects a subsequent sub-portion of the portion of memory based on the step value, the second input hash value is a feedback hash value from a hash from a previous iteration, and the authenticator engine performs a hash upon the subsequent sub-portion and the feedback hash value; and
   wherein in a last iteration, responsive to all sub-portions being read and hashed, the comparison circuit compares a result of the hash of a last sub-portion and a last feedback hash value to the expected value.

2. The system of claim 1, wherein the hash employed by the authenticator engine comprises a non-commutative cumulative function.

3. The system of claim 2, wherein the non-commutative cumulative function further employs an AND function to hash the portion of memory and the second input value.

4. The system of claim 1, wherein the step value does comprises a prime number relative to the number of sub-portions in the portion of code.

5. The system of claim 1, wherein the authenticator engine employs an XOR function to hash the portion of memory and the second input value.

6. The system of claim 1, wherein the sub-portion of the portion of memory comprises a word.

7. The system of claim 1, wherein the system repeats authentication of the code using a plurality of initial seed values, a plurality of corresponding skip values, and a plurality of corresponding expected values.

8. A method for authentication of a computer code sequence, comprising:
   reading a step value and an expected value;
   reading an initial seed value to a first hash input;
   reading a selected memory portion from a computer code sequence in memory to a second hash input according to the step value;
   hashing the first hash input and the second hash input;
   feeding back the hash result into the first hash input for a next iteration;
   repeating the steps of reading a selected memory portion to the second hash input according to the step value, hashing the first hash input and the second hash input to produce a hash result, and feeding back the hash result into the first hash input for a next iteration until all memory portions have been hashed; and
   responsive to all memory portions being hashed, comparing a last result of the hash with the expected value.

9. The method of claim 8, wherein the step of hashing further comprises rotating left the most significant digit of the second hash input.

10. The method of claim 8, wherein the step of hashing further comprises employing a non-commutative cumulative combination.

11. The method of claim 8, wherein reading a selected memory portion to a second hash input according to the step value further comprises employing a memory wrap around for selecting a memory portion such that all memory portions are selectable according to the step value.

12. The method of claim 8, further comprising repeating the method for authentication of a computer code sequence using a plurality of initial seed values, a plurality of corresponding step values, and a plurality of corresponding expected values.

13. The system of claim 1, wherein the portion of code is boot code.

14. The system of claim 1, wherein the system determines that the portion of code has been altered if the result of the hash of the last sub-portion and the last feedback hash value is not equal to the expected value.

15. The system of claim 1, wherein the initial seed value, the step value, and the expected value are stored in a non-volatile memory.

16. The method of claim 8, wherein the computer code sequence is boot code.

17. The method of claim 8, further comprising:
   determining that the portion of code has been altered if the result of the hash of the last sub-portion and the last feedback hash value is not equal to the expected value.

* * * * *